(12) United States Patent
Griffin (10) Patent No.: US 11,682,017 B2
(45) Date of Patent: Jun. 20, 2023

(54) SYSTEMS AND METHODS FOR ELECTRONIC PAYMENTS WITH FRAUD PREVENTION (71) Applicant: PERK HERO SOFTWARE INC., Vancouver (CA)

(72) Inventor: Desmond Griffin, Vancouver (CA)

(73) Assignee: Perk Hero Software Inc., Vancouver (CA)

( * ) Notice: Subject to any disclaimer, the term of this patent is extended or adjusted under 35 U.S.C. 154(b) by 218 days.

(21) Appl. No.: 16/648,141

(22) PCT Filed: Sep. 18, 2018

(86) PCT No.: PCT/CA2018/051159
§ 371 (c)(1),
(2) Date: Mar. 17, 2020

(87) PCT Pub. No.: WO2019/051617
PCT Pub. Date: Mar. 21, 2019

(65) Prior Publication Data
US 2020/0219108 A1 Jul. 9, 2020

Related U.S. Application Data (60) Provisional application No. 62/559,952, filed on Sep. 18, 2017.

(51) Int. Cl.
*G06Q 20/40* (2012.01)
*G06Q 20/32* (2012.01)
(52) U.S. Cl.
CPC ... *G06Q 20/40145* (2013.01); *G06Q 20/3223* (2013.01); *G06Q 20/3227* (2013.01)

(58) Field of Classification Search
CPC ......... G06Q 20/40145; G06Q 20/3223; G06Q 20/3227
See application file for complete search history.

(56) References Cited

U.S. PATENT DOCUMENTS 5,933,515 A * 8/1999 Pu .............................. G07C 9/37
340/5.53
8,566,188 B2 * 10/2013 Smith ................... G06Q 20/102
455/414.1

(Continued)

OTHER PUBLICATIONS

Inernational Search Report and Written Opinion; PCT/CA2018/051159 dated Dec. 6, 2018.

(Continued)

*Primary Examiner* — Mike Anderson
*Assistant Examiner* — Paul R Kloberg
(74) *Attorney, Agent, or Firm* — Ridout & Maybee LLP (57) ABSTRACT

A system and method for online payment are described. The method includes receiving, from a vendor server, a payment amount, an identifier of a user and an identifier of a vendor; sending an indication of a payment to a user device associated with the identifier of the user; receiving, from the user device, a confirmation of the payment; receiving, from the user device, supplementary information generated when or after the user confirms the payment; determining legitimacy of the transaction based on the supplementary information; and making the payment from a financial account associated with the user identifier to a financial account associated with the identifier of the vendor if the transaction is legitimate.

11 Claims, 2 Drawing Sheets (56) References Cited

U.S. PATENT DOCUMENTS

| | | | | |
|---|---|---|---|---|
| 8,836,473 | B2* | 9/2014 | Wadia | G06Q 20/4012 |
| | | | | 340/5.53 |
| 10,430,792 | B2* | 10/2019 | Phadke | G06F 21/6245 |
| 10,438,202 | B2* | 10/2019 | Neighman | G06Q 20/4012 |
| 2013/0024366 | A1* | 1/2013 | Mukherjee | G06Q 20/20 |
| | | | | 705/40 |
| 2014/0289819 | A1* | 9/2014 | Lindemann | H04L 9/0822 |
| | | | | 726/5 |
| 2015/0161613 | A1* | 6/2015 | Zhang | G06Q 20/10 |
| | | | | 705/26.81 |
| 2016/0019536 | A1* | 1/2016 | Ortiz | G06Q 20/36 |
| | | | | 705/67 |
| 2016/0092860 | A1* | 3/2016 | Klingen | G06Q 20/42 |
| | | | | 705/35 |
| 2016/0125412 | A1* | 5/2016 | Cannon | G06Q 20/4014 |
| | | | | 705/44 |
| 2017/0004482 | A1* | 1/2017 | Mancini | G06Q 20/42 |
| 2017/0032354 | A1* | 2/2017 | Tilahun | G06Q 20/3278 |
| 2017/0161720 | A1* | 6/2017 | Xing | G10L 15/22 |
| 2018/0081528 | A1* | 3/2018 | Chan | G06F 3/04883 |
| 2018/0330346 | A1* | 11/2018 | Grassadonia | G06Q 20/40 |
| 2018/0335928 | A1* | 11/2018 | Van Os | G06F 3/04817 |
| 2018/0349583 | A1* | 12/2018 | Turgeman | H04L 63/0861 |

OTHER PUBLICATIONS

Notification concerning transmittal of IPRP; PCT/CA2018/051159 dated Apr. 2, 2020.

* cited by examiner

SYSTEMS AND METHODS FOR ELECTRONIC PAYMENTS WITH FRAUD PREVENTION

RELATED APPLICATION

This application claims priority from U.S. provisional patent application No. 62/559,952, filed Sep. 18, 2017, entitled WIRELESS SYSTEMS AND METHODS FOR ONLINE PAYMENTS, which is incorporated herein by reference.

TECHNICAL FIELD

Example embodiments relate to the fields of electronic payment transactions and systems and methods for enabling online payments using a mobile device.

BACKGROUND

Traditional systems and methods for payment of bills or charges on a website or other online platform are vulnerable to fraudulent transactions.

SUMMARY OF INVENTION

Payment is made using an account securely maintained by the service provider and without the user providing credit card information to a vendor with an unsecured website or online facility. Even if secure website or online payment services are provided by the vendor, the mobile device electronic transaction payment provider can offer better verification and fraud detection for the electronic transaction. Verification and fraud detection are improved through the use of mobile device factors, i.e. additional technologies, device data and/or user data available on or associated with a mobile device, such as cameras, accelerometers, device orientation, global positioning systems (GPS) and data, touch screens, micro-location beacons, user usage history, facial recognition, fingerprint authentication, or verification of mobile phone numbers or device identifiers. These factors may be used in addition to the standard debit and credit fraud tools or information such as expiry dates, address verification, card verification value (CCV) data etc.

The present application describes methods, devices and systems which enable a user to complete an electronic transaction for a website payment or online payment using a mobile device. Specifically, a payment transaction initiated at a website, or at an online kiosk or device may be routed through and completed with the assistance of a mobile device electronic payment service provider.

In one embodiment, the mobile device is used as a secondary device for completing an electronic payment transaction initiated through a primary device. The primary device may be a desktop computer used to access a traditional website, or an online wired or wireless kiosk or device provided by a vendor for completing an electronic purchase. In other embodiments, the mobile device is used to access the website and initiate a purchase, which is then completed with the assistance of the mobile device electronic payment services provider. In an aspect, there is provided a method for making an online payment for a transaction, comprising: receiving, from a vendor server, a payment amount, an identifier of a user and an identifier of a vendor; sending an indication of a payment to a user device associated with the identifier of the user; receiving, from the user device, a confirmation of the payment; receiving, from the user device, supplementary information generated when or after the user confirms the payment; determining legitimacy of the transaction based on the supplementary information; and making the payment from a financial account associated with the user identifier to a financial account associated with the identifier of the vendor if the transaction is legitimate.

In another aspect, there is provided a non-transitory computer readable medium having instructions stored thereon for making an online payment for a transaction, the instruction when executed cause a process comprising: receiving, from a vendor server, a payment amount, an identifier of a user and an identifier of a vendor; sending an indication of a payment to a user device associated with the identifier of the user; receiving, from the user device, a confirmation of the payment; receiving, from the user device, supplementary information generated when or after the user confirms the payment; determining legitimacy of the transaction based on the supplementary information; and making the payment from a financial account associated with the user identifier to a financial account associated with the identifier of the vendor if the transaction is legitimate.

BRIEF DESCRIPTION OF THE DRAWINGS

Reference will now be made, by way of example, to the accompanying drawings which show example embodiments of the present application, and in which.

While the invention will be described in conjunction with the illustrated embodiments, it will be understood that it is not intended to limit the invention to such embodiments. On the contrary, it is intended to cover all alternatives, modifications and equivalents that may be included within the spirit and scope of the invention described herein.

DETAILED DESCRIPTION OF EXAMPLE EMBODIMENTS

Figure 1:
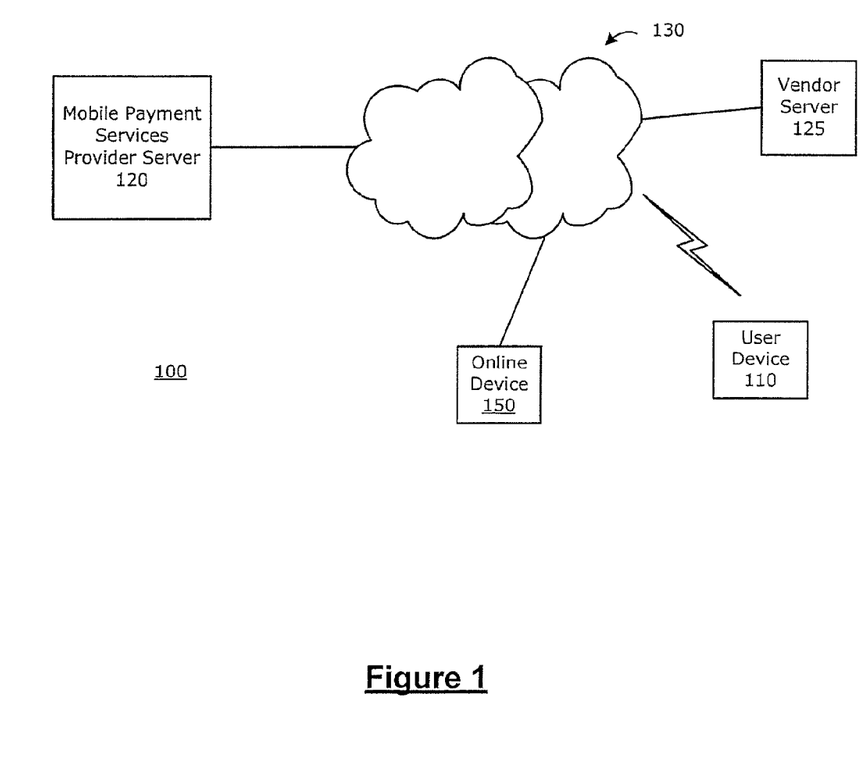
FIG. 1 is a block diagram illustrating a system in accordance with one embodiment of the present disclosure.

The methods, devices and systems of the present application are described in further detail below. FIG. 1 illustrates a payment system 100 according to one embodiment of the present application. The system 100 may include one or more user devices 110, a Mobile Payment Services Provider Server (MPSPS) 120, and a vendor server 125 which may be a mobile device or a non-mobile computer. The MPSPS 120 may be maintained by a mobile device electronic payment service provider.

The user device 110 may be a wireless communications devices, such as a mobile phone, cellular phone, smart phone, tablet, smart watch, or other wireless communications device. The user device 110 has a processor and a memory configured to store and execute instructions for perform the online payment methods described herein. The user device 110 has one or more sensors or components such as a camera, Global Positioning System (GPS), touch screen, fingerprint recognition system, accelerometer, micro-location beacons, or combinations thereof. The user device 110 may include a wireless communication module for supporting wireless communications with the MPSPS 120 or the vender server 125, for example, via the communications network 120. The user device 110 may also include a user interface, such as a display screen, keypad or buttons, and other inputs/outputs.

The user device 110 may be used to initiate an online transaction, such as an online transaction at a website operated by a vendor, represented in FIG. 1 by a vendor computer or server 125. For example, a user may use the user device 110 to purchase goods or services online from the vendor at the vendor's website, and use the user device 110 to complete the payment using the online payment methods described herein.

The MPSPS 120 may include a communications interface, a processor and a memory configured to store and execute instructions to preform the online payment methods described herein. While shown as a single entity, the MPSPS 120 may consist of multiple processing, storage and communication devices and interfaces configured to carry out the functions described herein. The MPSPS 120 also is configured to exchange messages or instructions electronically with one or more financial institutions (not shown) or other external databases in order to effect and resolve payments between customer accounts and the bank accounts for vendors.

The vendor server 125 may include a processor and a memory configured to store and execute instructions for operating one or more websites for the online sales of goods and services and/or for supporting transactions for the sales of goods or services initiated through the user device 110. In some embodiments, the vendor server 125 is configured to provide an online user interface which includes an input field allowing for the identification of the user such as a cell phone number, email address, or a unique user identifier name, number or code which may be always present or may be prompted for input via a control button, check box or pop-up window for a user to select for the option to complete the transaction for the desired goods and services through the mobile device electronic payment services provider, such as MPSPS 120.

The communications between the user device 110, the MPSPS 120 and the vendor server 125 may be achieved through a communications network 130. The network 130 includes one or more wired or wireless communications networks such as a cellular telecommunications network, a wireless local area network (WLAN), such as a network operating according to the IEEE 802.11 standard or WiFi™, or combinations thereof, including the Internet and related backbone networks (not shown). The network 130 may include an unrestricted or free public WLAN, such as a WLAN provided by the retail establishment itself. Since the electronic payment software application described herein does not require an existing user to send sensitive financial information, such as a credit card number, to complete an online payment, the use of a less secure wireless network may be acceptable to the user.

Figure 2:
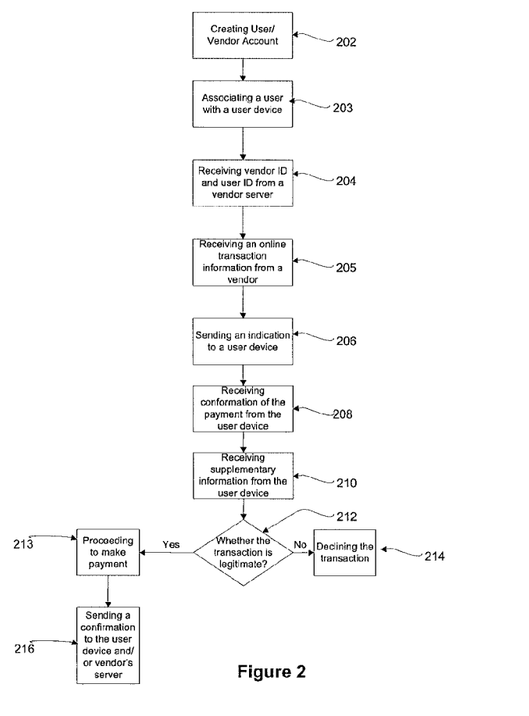
FIG. 2 is a flow chart illustrating an example of a method of online payment.

FIG. 2 is a flow chart illustrating an exemplary method 200 of online payment. At step 202, a user or a vendor first creates an account with the electronic transaction service provider, such as with the MPSPS 120. In the case of a use, to create a customer account, the user typically provides personal information to the electronic transaction service provider which can be used to identify and authenticate the user, such as one or more telephone numbers, addresses and postal code of the user's residence, passwords, user names, identifiers associated with the user's user device 110, or combinations thereof. In some examples, the user may also deposit samples of fingerprint with the MPSPS 120. In some examples, the user may deposit a facial image with the MPSPS 120 The user also typically provides data for at least one financial account or instrument such as a credit card, debit card, bank, online currency or other account, which is used to provide payments authorized by the user.

At step 203, the MPSPS 120 may associate the user device 110 with the customer account of the user, for example, by associating the telephone number and/or the media access control (MAC) address of the user device 110 with the customer account, and/or by associating a device ID generated by the operating system of the user device 110 with the customer account, and/or by having the MPSPS 120 installing a unique identification token on the user device 110 and MPSPS 120 associating the identification token with the customer account. The MPSPS 120 may associate at least one of the telephone number, the media access control (MAC) address, device ID, and the unique identification token of the user device 110 with the customer account of the user to uniquely identify the user device 110. By creating the customer account with the MPSPS 120, the user allows the MPSPS 120 to authenticate the payment from the user's financial account to others, such as to a vendor's financial account. The provided information and the created customer account may be stored in the memory of the MSPSP 120.

In the case of a vendor, the vendor, such as the vendor server 125, may also create a vendor account with the service provider MPSPS 120 at step 202. For example, the vendor may provide information to the service provider MPSPS 120 to enable the service provider MPSPS 120 to provide payments from the financial account associated with a customer account or a user device 110 to the vendor's financial account. The information provided by the vendor may be contact information of the vendor and banking or financial account information of the vendor for receiving payment from users. The provided information from the vendor and the created vendor account may be stored in the memory of the MSPSP 120. By creating the vendor's account with the MPSPS 120, the vendor financial account may receive payment from the MPSPS 120. With the vendor account, the MSPSP 120 may communicate with the vendor server 125 and make payment to the vendor's financial account, for example, via the network 130.

In some example, the information received and/or created for each customer and vendor account may be encrypted and securely stored in the memory of the MPSPS 120. The MPSPS 120 is configured to maintain the accounts and exchange messages with the user devices 110 and the vendor server 125.

The customer account and the vendor account may be created at any time through the network 130. It will be appreciated that a user or a vendor may choose to create an account at a time when the user has secure access to the network 130, such as through a home network or other interface with greater security than, for example, an unrestricted or free public WLAN. In some embodiments, the user may enter or select one or more preferences associated with the customer account and electronic transaction services. Such preferences may include, for example, preferred payment tips, tip percentage preferences, and loyalty rewards accounts or information.

In one embodiment, the user or customer uses the user device 110 to access a website, make a selection, and purchase of a vendor's goods and/or services. When a user reaches the stage of making an online payment for the desired goods/services, the user is prompted by the vendor server 125 to enter the user's identifier for uniquely identify the user. If the user has an account with the electronic payment services provider, such as MPSPS 120, the identifier may be an account name or number. Otherwise, the user's identifier may be a cellular phone number, email address or other unique contact information, such as address and postal code of the user's residence. The vendor server 125 passes the user's information and other transaction details including the payment amount to the MPSPS 120. As such, the MPSPS 120 receives the identifier of the user and the identifier of the vendor and a payment amount from the vendor server 125 (step 204).

In some examples, the MPSPS 120 may also receive additional transaction information from the vendor server 125 (step 205). Additional transaction information also may be provided by the vendor to MPSPS 120, such as a list of the goods or services for the purchase, tax information, a vendor location, shipping or pickup information, a link to an online purchase summary, the user's address and other contact information etc. The completion of the transaction using the service provider MPSPS 120 may be required by the vendor. The vendor server 125 is also configured to exchange messages with the MPSPS 120, such as via the network 130, in order to send the MPSPS 120 the information of an online sales transaction for a user and to receive notification of the completion or failure of a transaction.

Based on the identifier of the vendor, the MPSPS 120 identifies the vendor, the vendor account registered with the MPSPS 120, and the financial account associated with the vendor account.

After the MPSPS 120 receives the user's information and transaction information, based on the user's identifier, the MPSPS 120 determines whether the user has an account with the service provider.

If an account exists, the MPSPS 120 identifies the user, the associated user device 110, the user account registered with the MPSPS 120, and the financial account or payment card associated with the customer account.

The MPSPS 120 may then send an indication to the user device 110 to indicate that there is a pending payment request from the vendor (step 206). The indication may be a message or an email. The MPSPS 120 may send the indication by email message, text message or a notification generated by the MPSPS 120. After the indication is opened, it may display a notice of a pending payment request from the service provider MPSPS 120 for the purchase initiated by the user with the vendor. In some examples, the MPSPS 120 may incorporate the additional information provided by the vendor server 125 at step 205 in the indication sent to the user devices 110. The additional information provided by the vendor server 125 helps the user to understand the payment request, such as the vendor and transaction information. In some examples, the indication may prompt the user to confirm the payment amount for the transaction and the vendor. The user may then confirm the payment, for example, by clicking a confirming control button. The MPSPS 120 receives confirmation of payment from the user (step 208). In some examples, when the user confirms that payments, the user device 110 also sends supplementary information to the MPSPS 120. The supplementary information are generated when or after the user confirms payment. In this case, the MPSPS 120 receives the supplementary information from the user device 110 (step 210). Any other transaction details or links provided by the vendor server 125 to MPSPS 120 also may be sent to and displayed by the user device 110.

After MPSPS 120 receives confirmation of the payment and supplementary information from the user device 110, MPSPS 120 may examine the supplementary information to determine the legitimacy of transaction based on the supplementary information from the user device 110 (step 212).

The process of the determining the legitimacy of the transaction will be described in greater detail below. If the MPSPS 120 determines that the transaction is legitimate, the MPSPS 120 authenticates the payment and proceeds to make the payment (step 213). If the MPSPS 120 determines that the transaction is not legitimate, the MPSPS 120 declines the payment and terminates the transaction (step 214).

In some examples, the supplementary information includes the information or results measured by an accelerometer of the user device 110. The information measured by the accelerometer may indicate the speed of the user's movement through the touch screen of the user device 110. The accelerometer tracks movements of the user device 110 and behaviours demonstrated from the movements of the user device 110 may be used to determine the behaviour of the user, for example, to determine whether the user devices 110 is used by a legitimate user or a fraudster. The speed of the movement may be reflected in the manner in which the user holds and moves the user device 110. In some examples, if information measured by the accelerometer shows that the user moves through the touch screen quickly and is less than a first threshold, such as 0.5 seconds, the MPSPS 120 may determine that the user is a fraudster and refuse the transaction by declining to authenticate the payment. If the information measured by the accelerometer shows that the user moves through the touch screen between a first threshold, such as 0.5 seconds, and a second threshold, such as less than 1 second, the MPSPS 120 may determine that the user may be a non-fraudster, and subsequent security measures may follow to further authenticate the user. The subsequent security measures may include security questions, such as date of birth or address of the user. If the information measured by the accelerometer shows that the user moves through the touch screen slower than the second threshold, such as more than 1 second, the MPSPS 120 determines that the user is a legitimate user. In this case, the MPSPS 120 proceeds to authenticate the payment from the user financial account to the vendor financial account ( ).

When the user is registered with the MPSPS 120, the user may also provide the samples of fingerprint of the user, such as the fingerprint of the fingers, to the MPSPS 120. Alternatively or additionally, the supplementary information may include at least one fingerprint of the user, for examples, the fingerprint may be obtained by the user device 110 when the user confirms the transaction. The MPSPS 120 proceeds to authenticate a payment if the fingerprint deposited with the MPSPS 120 and the fingerprint provided in the supplementary information are sufficiently similar, for example, if the match score of the similarity between the fingerprint deposited with the MPSPS 120 and the fingerprint provided in the supplementary information is equal to or higher than a threshold, such as 90.

In some examples, the supplementary information may include GPS coordinates generated by the GPS of the user device 110. The MPSPS 120 may then compare the location identified by the GPS coordinates with the postal code and/or address of the user's residence stored in the MPSPS 120. If the location identified by the GPS coordinates correspond to the postal code and/or address stored in the MPSPS 120, the MPSPS 120 proceeds to authenticate the payment from the customer financial account to the vendor's financial account. If the GPS coordinates do not correspond to the postal code and/or address stored in the MPSPS 120, the MPSPS 120 declines to authenticate the payment. In some examples, the MPSPS 120 may consider that the GPS coordinates correspond to the postal code and/or address stored in the MPSPS 120 if the distance of the locations identified by the GPS coordinates and the by the postal code and/or address is within a threshold, such as within 20 meters. In some examples, the supplementary information may include locations of beacons, locations of Bluetooth™ receivers, and locations of the transceivers of the Wi-Fi™ at the vendor's location may also be used to determine the actual location of the user device 110. For example, MPSPS 120 can determine the actual location of the user device 110 based on the locations of at least one of beacons, Bluetooth™ receivers or transceivers of the Wi-Fi™ at the vendor's location. The MPSPS 120 may then compare the actual location of the user device 110 with the location of the vendor stored in the MPSPS 120. If the both locations match, the MPSPS 120 proceeds to authenticate the payment from the customer financial account to the vendor's financial account. For example, the location of the user device 110 and the location of the vendor match if both distance between the two locations is within a threshold, such as within 20 meters.

In some examples, the user may enter the postal code and/or the address of the location at which the user confirms payment, and the postal code and/or the address may also be transmitted to the MPSPS 120 in the supplementary information. In this case, if the location identified by the GPS coordinates correspond to the postal code and/or address provided in the supplementary information, the MPSPS 120 proceeds to authenticate the payment from the customer financial account to the vendor's financial account. If the location identified by the GPS coordinates does not correspond to the postal code and/or address provided in the supplementary information, the MPSPS 120 declines to authenticate the payment.

In some examples, the supplementary information transmitted from the user device 110 to the MPSPS 120 may include images taken by a camera of the user device 110. The images may include the image of the person confirming the payment, the image of the environment when the payment is confirmed. In some examples, the MPSPS 120 may analyze the background of the images to determine repeated fraudster activity For example, if the background imagery appears to be similar to a previously known fraudster background stored in the MPSPS 120 to a predetermined threshold or if the user is supposed to be in a retail location and the background appears to be in a different environment, the MPSPS 120 declines to authenticate the payment In some examples, the user device 110 may include facial recognition function. The user device 110 may take and compare the facial image of the user confirming the payment with the facial image of the user stored in the user device 110. In some examples, the supplementary information transmitted from the user device 110 to the MPSPS 120 may include a facial comparison results by the user device 110. If the comparison results shows that the facial features of the image of taken by the camera of the user device 110 matches the image of the face of the user stored in the user device 110 equal to or above a predetermined threshold, the MPSPS 120 authenticates the payment and proceed to make the payment from the customer financial account to the vendor's financial account. If the comparison results indicates that the facial features of the image of the user taken by the camera of the user device 110 does not match the image of the face of the user stored in the user device 110 to the predetermined threshold, the MPSPS 120 declines to authenticate the payment and the transaction is terminated. In some examples, the operating system of the user device 110 may perform the facial recognition analysis, for example similar to the facial recognition function performed in commercially available smart phones or tablets. The user device 110 may transmit the analysis results to the MPSPS 120. The MPSPS 120 may authenticates the payment and proceed to make the payment from the customer financial account to the vendor's financial account if the analysis results equal to or above a predetermined threshold. The MPSPS 120 declines to authenticate the payment and terminates the transaction if the analysis results is below a predetermined threshold.

In some examples, the facial image of the user taken by a camera of the user device 110 is sent to the MPSPS 120 in the supplementary information and the MPSPS 120 may compare the received facial image with the facial image deposited with the MPSPS 120. For example, the MPSPS 120 may apply statistical analysis and artificial intelligence, such as artificial neural networks, to compare the received facial image with the facial image deposited with the MPSPS 120. If the facial features of an image of the user taken by the camera of the user device 110 matches the facial image of the user stored in the MPSPS 120 equal to or above a predetermined threshold, the MPSPS 120 proceeds to authenticate the payment and make the payment from the customer financial account to the vendor's financial account. If the facial features of the image of the user does not match the facial image of the user stored in the MPSPS 120 to the predetermined threshold, the MPSPS 120 declines to authenticate the payment and the transaction is terminated.

In some examples, the supplementary information may include at least two of the information or results measured by an accelerometer of the user device 110, fingerprint of the user, GPS coordinates generated by the GPS of the user device 110, postal code and/or the address of the location at which the user confirms payment, images taken by a camera of the user device 110, and the MPSPS 120 may use the corresponding approaches described above to examine the supplementary information and to determine the legitimacy of transaction based on the supplementary information from the user device 110. In some examples, a transaction is legitimate if all of the supplementary information indicates the transaction is legitimate.

As such, in addition to confirmation of a payment from a user, by using the supplementary information from the user device 110, MPSPS 120 improves fraud detection in an online payment.

If no fraud is detected, namely that the MPSPS 120 determines the that the transaction is legitimate based on the confirmation from the user and supplementary information provided by the user device 110, the MPSPS 120 causes an electronic payment transaction to occur so that payment for the confirmed amount of the purchase is debited from the financial account associated with the user and credited to the financial account associated with the vendor.

In some examples, the MPSPS 120 may not retain or provide funds to either the user or the vendor. Instead, the MPSPS 120 securely requests and authorizes the appropriate payment or credit transactions between the financial account of the user, and the bank or financial account associated with the vendor. It will be appreciated that the MPSPS 120 also may be configured to support other types of payment transactions such as a deduction from a customer's rewards account and a corresponding update or notification to the vendor's account when a user redeems rewards points, coupons, promotional offers etc. In some embodiments, the payment is processed in real time to effect payment directly between the user and the vendor. In other embodiments deductions from a user account and/or payments to a vendor account may be grouped for processing later in order to reduce processing costs.

The MPSPS 120 sends a confirmation of completion of payment to the vendor (step 216). The confirmation message from the MPSPS 120 to the vendor may be sent in an application programming interface (API), email message, text message, or a notification raised by the payment software application on the vendor server. The MPSPS 120 may also send a confirmation of payment to the user device 110, such as in an email message, text message or notification (step 216). The notification signals that the user's payment and order with the vendor is complete. Additionally or alternatively, after the vendor server 125 receives the confirmation form the MPSPS 120, the vendor server 125 may send a message or notification to the user device 110 to signal both the completion of the order and the completion of payment through the electronic payment service provider MPSPS 120.

Thus, any traditional verification or fraud detection mechanisms used or relied on by the vendor or other financial services providers are augmented by additional fraud detection mechanisms where the MPSPS 120 uses the supplementary information received from the user device 110 to determine the legitimacy of a transaction. As well, with the MPSPS 120, the vendor may continue the operation of traditional websites and services for supporting online purchases without significant changes to the website to support enhanced fraud detection.

If the purchase is being made by a new user who does not have an account with the electronic payment services provider, the new user may be contacted using the unique contact information supplied by the new user and forwarded by the vendor server 125. The new user thus may be contacted by text message or email message with an indication of a pending payment request and a request to create an account with the service provider MPSPS 120. The message or email may include a link to the service provider server MPSPS 120. Once the user has created an account with the service provider MPSPS 120 as described in step 200, the online payment is then proceeded with the remaining steps of the method 200 described above.

The method 200 described above also may be used to authenticate a transaction initiated by a user through the online devices or interfaces. In some examples, the system 100 may include a second device through which an online payment transaction is initiated, such as an online device 150 as shown in FIG. 1. The online device 150 may be a wired or wireless computing device, such as a desktop computer, a stationary computer, or an online wired or wireless kiosk or device provided by a vendor for completing an electronic purchase.

For example, the user may initiate a transaction through the online device 150, such as a desktop computer or a vendor's online kiosk. The user device 110 of the user still may be used for verification of the payment in order to complete the transaction. Messages or information are exchanged between the MPSPS 120 and the vendor server 125 which operates the website or interface being displayed on the online device 150. Similar to the operations described above, the interface presented by the vendor on the online device 150 either prompts the user to select an option to complete the transaction for the desired goods and services through the mobile device electronic payment services provider MPSPS 120. Alternatively, the completion of the transaction using the service provider is not optional and is required by the vendor. Once the user has entered an identifier of the user into the online device 150, the MPSPS 120 identifies the user, the associated user device 110, the user account registered with the MPSPS 120, and the financial account associated with the customer account. The MPSPS 120 may then sends an indication to the user device 110 to indicate that there is a pending payment request from the vendor. The transaction may then be proceeded between the user device 110 and the MPSPS 120 with steps 208-216 of the method 200 described above. The user device 110 provides supplementary information to the MPSPS 120.

In other embodiments, the vendor server 125 may generate a unique order code identifier which is displayed to the user on the website and/or through the online device 150. The unique order code identifier also may be sent to the user in an email message or text message sent by the vendor server 125 to the user to confirm the order. The user may enter the unique order code identifier on the user device 110 and lookup a payment on the MPSPS 120. Once the MPSPS 120 receives the unique order code identifier, the MPSPS 120 uses the order code to determine the payment details and send a notification to the user device 110 to confirm the payment. In this case, the online payment may proceed from steps 208-216 as described above in method 200.

In other embodiments, it will be appreciated that the services of the vendor server 125 and the services of the mobile device electronic payment services provider MPSPS 120 may be provided from the same server. Additionally or alternatively, the same entity may operate and provide both services such that the initiation of the order and transaction with the vendor, and the verification and completion of the transaction using method 200 described above, are integrated as one service.

Although the exemplary embodiments described herein employ the memory, other types of computer readable media which can store data that are accessible by a computer, such as magnetic cassettes, flash memory cards, digital versatile disks, cartridges, random access memories (RAMs), read only memory (ROM), USB or memory sticks, a cable or wireless signal containing a bit stream and the like, also may be used in the exemplary operating environment. Non-transitory computer-readable storage media expressly exclude media such as energy, carrier signals, electromagnetic waves and signals per se. The processor described in the MPSPS 120, the vendor server may be a central processing unit (CPU).

Thus, it is apparent that there has been provided in accordance with the embodiments of the present disclosure systems and methods for electronic payment transactions that fully satisfy the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The invention claimed is:

1. A method for electronic payments performed by a payment services provider server, comprising:
   receiving, from a vendor server, a transaction request comprising a payment amount, a user identifier and a vendor identifier;
   sending an indication of the transaction request to a wireless communication device associated with the user identifier;
   receiving, from the wireless communication device, a confirmation of the transaction request;

receiving, from the wireless communication device, supplementary information gathered during input of the confirmation of the transaction request, the supplementary information comprising accelerometer data measured by an accelerometer of the wireless communication device during the input of the confirmation of the transaction request;

determining whether the transaction request is legitimate based on the supplementary information, the supplementary information including the accelerometer data measured by the accelerometer of the wireless communication device, wherein in response to a determination that the accelerometer data measured by the accelerometer of the wireless communication device indicates that a speed of the input of the confirmation of the transaction request was less than a first duration threshold, the transaction request is determined to be not legitimate, wherein in response to a determination that the accelerometer data measured by the accelerometer of the wireless communication device indicates that the speed of the input of the confirmation of the transaction request was equal to or more than a second duration threshold, the transaction request is determined to be legitimate;

in response to a determination that the transaction request is legitimate:
  approving the transaction request;
  causing a payment from a financial account associated with the user identifier to a financial account associated with the vendor identifier in response to the approving, wherein payment is defined by a payment transaction, the causing comprising sending a request to initiate the payment transaction from the financial account associated with the user identifier to the financial account associated with the vendor identifier in response to the approving; and
  sending a confirmation of payment to the vendor server and/or the wireless communication device; and
declining the transaction request in response to a determination that the transaction request is not legitimate.

2. The method of claim 1, further comprising:
receiving additional transaction information from the vendor server and incorporating the additional transaction information in the indication.

3. The method of claim 1, wherein the supplementary information includes data indicative of at least one fingerprint and wherein the transaction request is determined to be not legitimate in response to a determination that a match score of similarity between a stored fingerprint and the at least one fingerprint is less than a similarity threshold.

4. The method of claim 3, wherein the transaction request is determined to be legitimate in response to a determination that the match score of similarity between the stored fingerprint and the at least one fingerprint is equal to or greater than the similarity threshold.

5. The method of claim 1, wherein the supplementary information includes data indicative of Global Positioning System coordinates of the wireless communication device and wherein the transaction request is determined to be legitimate in response to a determination that a location identified by the Global Positioning System coordinates corresponds to a stored location information for the user identifier.

6. The method of claim 1, wherein the supplementary information includes a facial comparison result by the wireless communication device and wherein the transaction request is determined to be legitimate in response to a determination that the facial comparison result is equal to or above a predetermined threshold.

7. The method of claim 1, wherein the user identifier comprises at least one of a telephone number, a media access control (MAC) address, a device identifier (ID), and a unique identification token of the user device.

8. The method of claim 1, wherein the transaction request is received via a vendor website.

9. The method of claim 1, wherein the input of the confirmation of the transaction request represents one or more touch inputs on a touch screen of the wireless communication device.

10. A method for electronic payments performed by a payment services provider server, comprising:
receiving, from a vendor server, a transaction request comprising a payment amount, a user identifier and a vendor identifier;
sending an indication of the transaction request to a wireless communication device associated with the user identifier;
receiving, from the wireless communication device, a confirmation of the transaction request;
receiving, from the wireless communication device, supplementary information gathered during input of the confirmation of the transaction request, the supplementary information comprising Global Positioning System coordinates of the wireless communication device during the input of the confirmation of the transaction request;
determining whether the transaction request is legitimate based on whether the Global Positioning System coordinates of the wireless communication device matches stored location information associated with the user identifier,
wherein in response to a determination that the Global Positioning System coordinates generated by the user device does not match the stored location information associated with the user identifier within a distance threshold, the transaction request is determined to be not legitimate,
wherein in response to a determination that the Global Positioning System coordinates generated by the user device matches the stored location information associated with the user identifier within a distance threshold, the transaction request is determined to be legitimate;
in response to a determination that the transaction request is legitimate:
  approving the transaction request;
  causing a payment from a financial account associated with the user identifier to a financial account associated with the vendor identifier in response to the approving, wherein payment is defined by a payment transaction, the causing comprising sending a request to initiate the payment transaction from the financial account associated with the user identifier to the financial account associated with the vendor identifier in response to the approving; and
  sending a confirmation of payment to the vendor server and/or the wireless communication device; and
declining the transaction request in response to a determination that the transaction request is not legitimate.

11. A method for electronic payments performed by a payment services provider server, comprising:
receiving, from a vendor server, a transaction request comprising a payment amount, a user identifier and a vendor identifier;

sending an indication of the transaction request to a wireless communication device associated with the user identifier;
receiving, from the wireless communication device, a confirmation of the transaction request;
receiving, from the wireless communication device, supplementary information gathered during input of the confirmation of the transaction request, the supplementary information comprising biometric data collected by the wireless communication device during the input of the confirmation of the transaction request, the biometric data comprising one or both of data indicative of at least one fingerprint and a facial comparison result by the wireless communication device;
determining whether the transaction request is legitimate based on whether the biometric data matches stored biometric data associated with the user identifier,
wherein in response to a determination that the match score of the comparison between the biometric data collected by the wireless communication device during the input of the confirmation of the transaction and the stored biometric data associated with the user identifier is lower than a predetermined threshold, the transaction request is determined to be not legitimate,
wherein in response to a determination that the match score of the comparison between the biometric data collected by the wireless communication device during the input of the confirmation of the transaction and the stored biometric data associated with the user identifier is equal to or above a predetermined threshold, the transaction is determined to be legitimate;
in response to a determination that the transaction request is legitimate:
approving the transaction request;
causing a payment from a financial account associated with the user identifier to a financial account associated with the vendor identifier in response to the approving, wherein payment is defined by a payment transaction, the causing comprising sending a request to initiate the payment transaction from the financial account associated with the user identifier to the financial account associated with the vendor identifier in response to the approving; and
sending a confirmation of payment to the vendor server and/or the wireless communication device; and
declining the transaction request in response to a determination that the transaction request is not legitimate.

* * * * *